May 12, 1959   E. UMRATH   2,886,759
PROTECTIVE DEVICE FOR RECORDERS AND THE LIKE
Filed Sept. 28, 1953
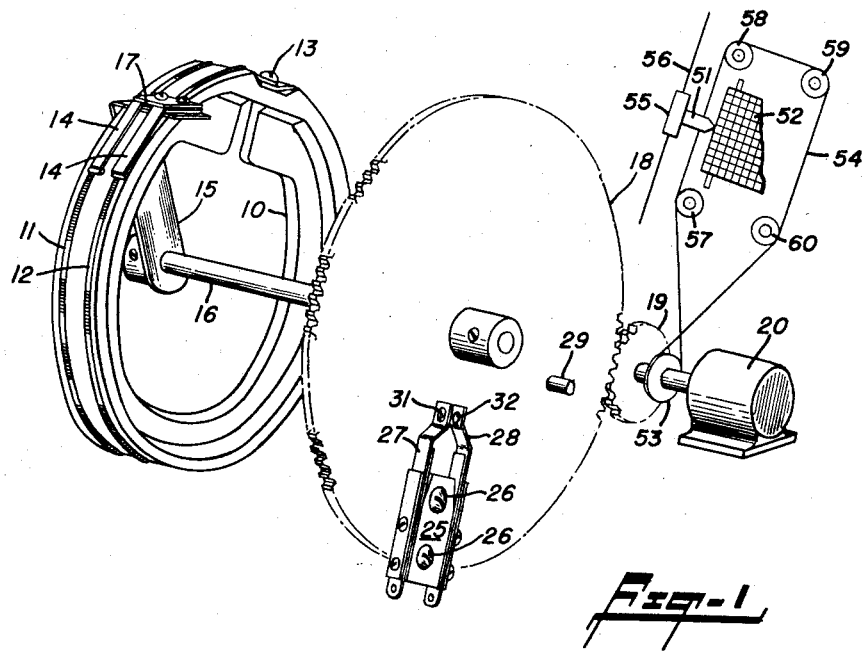
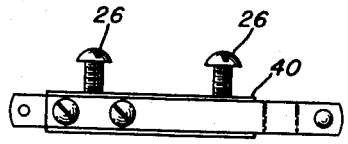
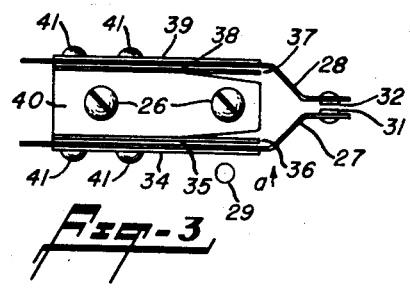
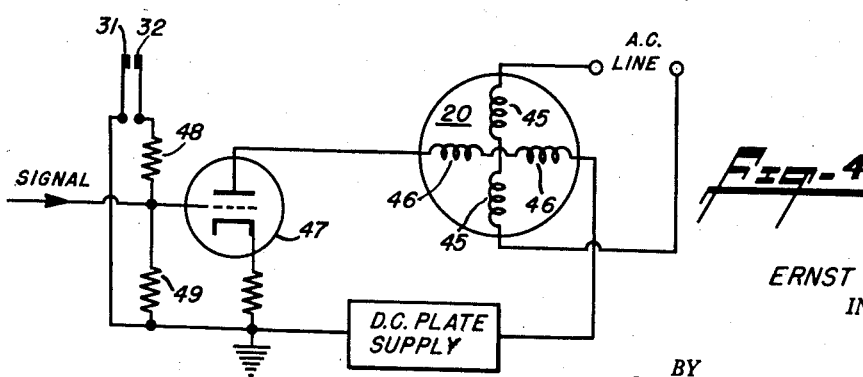
ERNST UMRATH
INVENTOR.
BY
*Gaylor, Cifelli & Junick*
ATTORNEYS United States Patent Office 2,886,759
Patented May 12, 1959

2,886,759
PROTECTIVE DEVICE FOR RECORDERS AND THE LIKE

Ernst Umrath, Bloomingdale, N.J., assignor, by mesne assignments, to Daystrom, Incorporated, Murray Hill, N.J., a corporation of New Jersey Application September 28, 1953, Serial No. 382,575

2 Claims. (Cl. 318—468)

This invention relates to a combination mechanical stop and electrical switch for use in apparatus of the type including a movable member driven by an electric motor in one direction or the other within predetermined limits and more particularly to an arrangement for preventing damage to the pen-drive mechanism and/or gearing system of a recorder when the input signal applied to the recorder is beyond the normal operating range of the device.

While the invention may be incorporated in any device or apparatus wherein damage may be caused to a movable member when the latter travels beyond an established limit, the description will be limited to the application of the invention to a recorder.

Recorders of the type to which this invention relates are useful in providing a measurement and record of variable conditions such as, for example, temperature, pressure, etc., which conditions can be converted into electrical quantities. The indication and recording of the instantaneous state of the variable condition is accomplished by electrical networks which are adapted to be unbalanced by a change in the condition and thereby to effect operation of suitable rebalancing means. Such rebalancing operations include the automatic actuation of suitable power means for simultaneously moving an inking pen over a constantly moving, calibrated chart. In devices of this type the rebalancing of the electrical network is done by means of a slide-wire potentiometer comprising helically-wound resistance wires and a slider, the point of bridging contact between the slider and the resistance wires being varied by an electric motor that is energized upon network unbalance. Such potentiometer slide wires may be either of the linear or circular type.

When the input signal applied to a potentiometric recorder is beyond the normal operating range of the instrument the pen carriage will travel at maximum speed toward its limit of operation at which point the pen-drive mechanism will strike against a mechanical stop. Due to the high speed of travel, especially in a modern high speed recorder, a considerable flywheel effect is developed which, in turn, causes a heavy impact upon the mechanism and the stop. Also, the pen-driving motor will tend to continue driving the mechanism against the mechanical stop at full motor torque as long as the input signal to the recorder remains beyond the normal operating range. The latter effect becomes particularly harmful to the system when gear reductions are employed, as is almost always the case. Both of the stated actions have a critical, adverse effect on the device and may result in stripping of the gears and/or the misalinement of the operating parts.

An object of this invention is the provision of a simple arrangement for protecting a potentiometric recorder from damage upon the application of an input signal beyond the normal operating range of the instrument.

An object of this invention is the provision of a novel mechanical shock absorber and electrical desensitizer switch for use on potentiometer type recorders.

An object of this invention is the provision of protective means for preventing damage to a potentiometric recorder when the input signal to the recorder is beyond the normal operating range of the device, said protective means comprising a plurality of leaf springs and associated electrical contacts disposed in the path of travel of a stop member defining the limits of motion of the recorder movable system, said leaf springs being arranged to serially absorb mechanical shock upon contact by the stop member and said electrical contacts being interposed in the electrical circuit to reduce the energy applied to the driving motor when the stop member deflects the leaf springs.

These and other objects and advantages will become apparent from the following description when taken with the accompanying drawings. It will be understood the drawings are for purposes of description and are not to be construed as defining the scope or limits of the invention, reference being had for the latter purpose to the appended claims.

In the drawings wherein like reference characters denote like parts in the several views:

Figure 1 is a more or less diagrammatic illustration showing the assembly of a circular slide wire, driving gear system and my combination mechanical shock-absorber and switch for desensitizing the driving motor;

Figure 2 is a side view of the shock-absorber and switch, and drawn to an enlarged scale;

Figure 3 is a top view of the shock-absorber and switch; and

Figure 4 is a fragmentary circuit diagram showing the control of the driving motor by the shock-absorber-switch device.

Referring now to Figure 1, I show a circular slide wire comprising a frame 10, made of insulating material, carrying the helically-wound resistance wires 11, 12 each anchored by suitable means including screws 13. Those skilled in this art will understand that the wires 11, 12 are connected into the measuring circuit of a potentiometric recorder as by suitable contact terminals secured in place by the screws 13.

The specific length of the resistance wires connected in the measuring circuit is determined by the angular position of the sliders 14 carried by the arm 15 which is secured to the drive shaft 16. In general, the two sliders are connected together electrically through the common, metal mounting plate 17 whereby both resistance wires are short-circuited at the point of contact with the sliders.

The shaft 16 is rotated, in one direction or the other, by a relatively large gear 18 and the latter is driven by a drive gear 19 that is mechanically coupled to a small electric drive motor 20. In actual practice a suitable gear chain is interposed between the shaft of the drive motor and the gear 18 but since the particular gearing or drive arrangement employed forms no part of the present invention the illustrated arrangement is deemed sufficient for purposes of illustration and description.

The driving mechanism for the recorder pen 51 is operated simultaneously with the sliders 14 whereby the recorder pen is moved linearly to a position corresponding to that of the sliders. Thus, upon an unbalance in the electrical network, as when the input signal to the recorder changes in response to a change in the variable condition being recorded, the sliders 14 will be rotated to again establish a condition of network balance. The extent of the linear movement of the pen corresponds to the extent of the angular rotation of the sliders whereby the pen will draw a line on the chart 52 at a point indicative of the change in the variable condition from the previous balance point.

The mechanism for operating the pen 51 simultaneously with the movement of the sliders 14 may be conventional or as shown in Figure 1 of the Wild Patent No. 2,633,558. A pulley or cable drum 53 may be secured to the drive shaft of the motor 20 and operate through a flexible cable 54 to adjust the pen carriage 55 along a guideway 56. The cable after passing from the drum 53 may be guided over idler pulleys 57, 58, 59, 60 and, by a connection with the carriage 55, move the pen one way or the other across the chart 52 in accordance with movement of the sliders 14.

When the input signal to the recorder is beyond the normal operating range of the instrument, the pen carriage will travel at a high rate of speed and some part of the mechanism will strike a mechanical stop. In a high speed recorder the inertia of the mechanism will result in a heavy impact which will eventually damage certain parts of the mechanism and/or throw the pen out of proper alinement. Further, the drive motor will continue to exert full torque as long as the input signal remains beyond the recorder operating range which effect is particularly harmful to the system when a gear reduction mechanism is involved, as is most generally the case.

In order to protect the recorder against the above-stated effects I provide a combination mechanical shock-absorber and motor desensitizing switch generally indicated by the numeral 25 in Figure 1. Such device is mounted in fixed position as by the mounting screws 26 and includes a pair of leaf springs 27, 28 extending into the path of travel of a stud 29 carried by the drive gear 18. This stud is so positioned on the drive gear that it does not engage the protruding ends of the leaf springs as the gear rotates throughout an angular extent corresponding to the normal operating range of the recorder. However, when the input signal to the recorder is below or above such recorder operating range the stud will strike one or the other of the leaf springs 27, 28. The inertia of the system is dissipated by a flexing of one or both of the leaf springs, depending upon the extent of the signal deviation beyond the normal operating range, and a closure of the contact points 31, 32 alters the electrical circuit to reduce the torque on the drive motor, as will be described in more detail with specific reference to Figure 4.

Reference is now made to Figures 2 and 3 which are side and top views, respectively, of the bumper-switch 25, with the thickness of the various leaf springs exaggerated for purposes of clarity. A plurality of relatively short leaf springs 34, 35, 36, and 37, 38 and 39 are associated with the relatively long leaf springs 27, 28 as shown, each set of springs being secured to the side edges of an insulator block 40 as by the screws 41. If we assume the out-of-range signal applied to the recorder is such as to bring the stud 29 (Figure 3) into engagement with the leaf spring 34, the impact of the system is successively absorbed by a progressive flexing of the leaf springs 34, 27, 35, 28, 39 and 36 in the order stated. It is here pointed out that almost immediately after the stud has contacted leaf spring 34, the contact points 31, 32 close an electrical circuit which, in effect, desensitizes the drive motor to such an extent that the remaining motor torque is not harmful to the system. The dimensions and spacings of the leaf springs are such that they are capable of absorbing the inertia of the entire system, at the reduced torque of the drive motor, after the initial closure of the contact points 31, 32. It will be apparent that as the stud 29 strikes the leaf spring 34 at a maximum velocity some of the initial impact is absorbed by the flexing of the leaf springs 27, 36. Further impact absorption takes place upon a flexing of the leaf spring 28 upon engagement of the contact points 31, 32. At this point the motor torque is reduced and the remaining inertia of the system is absorbed by a flexing of the leaf springs 36 and 39.

Reference is now made to Figure 4 which is a fragmentary circuit diagram illustrating how the closure of the switch contact points 31, 32 reduces the torque of the drive motor 20. The reference windings 45 of the drive motor are energized continuously by direct connection to the A.C. line whereas the control windings 46 are connected in the anode circuit of the tube 47. The input signal to the recorder is amplified and applied to the grid of the tube 47 whereby the current flowing in the motor control windings varies in accordance with the input signal variations. It will be noted that the switch contact point 31 is connected directly to ground and the contact point 32 is connected to the grid of the tube through a resistor 48, the latter having a relatively low ohmic value compared to that of the grid resistor 49. Therefore, closure of the contact points 31, 32 effectively bleeds off a certain amount of the input signal to ground which reduces the current in the control windings of the motor.

Those skilled in this art will know that when the measuring circuit of the recorder is balanced there is no signal on the grid of the tube controlling the drive motor. A variation of the input signal within the normal operating range of the recorder results in a motor rotation to bring the network back to the balanced condition in the normal manner since the contact points 31, 32 are open. A signal variation beyond the normal operating range of the recorder results in a closure of these contact points bringing about a reduction in the drive motor torque thereby preventing possible stripping of the gears when the movable components of the recorder are brought to rest by operation of the bumperswitch. After the impact of the system is absorbed, the elasticity of the flexed leaf springs tends to force the system in a reverse direction but such backward movement is opposed by the remaining, reduced-magnitude motor torque. The leaf springs are so designated that the two systems (the movable system of the recorder and the flexed leaf spring system) will be balanced at a point where the contact points 31, 32 remain closed thereby avoiding oscillation of the system caused by an opening and closing of the contact points. In such arrangement the contact points will open again only after the input signal changes to a magnitude within the normal operating range of the instrument.

Having now described my invention in detail in accordance with the patent statutes, various changes and modifications will occur to those skilled in this art and it is intended that such changes and modifications shall fall within the spirit and scope of the invention as recited in the following claims.

I claim:

1. A protective arrangement for a recorder of the class comprising a normally-balanced electrical circuit including a slide wire potentiometer, a gear mechanically coupled to the slider of the potentiometer, a vacuum tube having a cathode, grid and anode, a first resistor through which said grid is connected to ground, a motor coupled to the gear and having a winding energized by the anode current of the tube upon an unbalance of the electrical circuit; said protective arrangement comprising an actuating member carried by the gear; a pair of resilient, normally-open electrical contacts on blades secured in fixed position relative to the gear and adapted for closure upon a flexing of one of the blades by the actuating member; a lead connecting one of said blades to the tube cathode circuit; and a second resistor connected between the other blade and the tube grid, said second resistor having a relatively low ohmic value compared to that of said first resistor, whereby closure of said contacts effectively bleeds off to ground a certain amount of the recorder input signal and correspondingly reduces the current in the control windings of the motor.

2. A protective arrangement for a recorder of the class comprising a normally-balanced electrical circuit including a slide wire potentiometer, a gear mechanically coupled to the slider of the potentiometer, a vacuum tube having a cathode, grid and anode, a motor coupled to the gear and having a winding energized by the anode current of the tube upon an unbalance of the electrical circuit; said protective arrangement comprising an actuating member carried by the gear; a pair of resilient, spaced blades secured in fixed position relative to the gear and having ends extending into the path of travel of said actuating member; normally-open electrical contacts carried by the said ends of the blades and adapted for closure upon a flexing of one of the blades by the actuating member; a first leaf spring adapted to be flexed upon a predetermined flexure of one of said blades; a second leaf spring adapted to be flexed upon a predetermined flexure of both of said blades; a lead connecting one of said blades to the tube cathode circuit; and a resistor connected between the other blade and the tube grid.

References Cited in the file of this patent

UNITED STATES PATENTS

| Number | Name | Date |
|---|---|---|
| 1,851,117 | Sponable | Mar. 29, 1932 |
| 2,515,893 | Philpott | July 18, 1950 |
| 2,558,034 | Bolsey | June 26, 1951 |
| 2,602,865 | Maurer | July 8, 1952 |
| 2,633,558 | Wild | Mar. 31, 1953 |
| 2,637,619 | Stein | May 5, 1953 |
| 2,642,557 | Goldstein | June 16, 1953 |